Dec. 9, 1952 F. W. WARING 2,620,913
ANTIFRICTION LOAD SUPPORTING DEVICE
Filed Aug. 20, 1949 2 SHEETS—SHEET 2
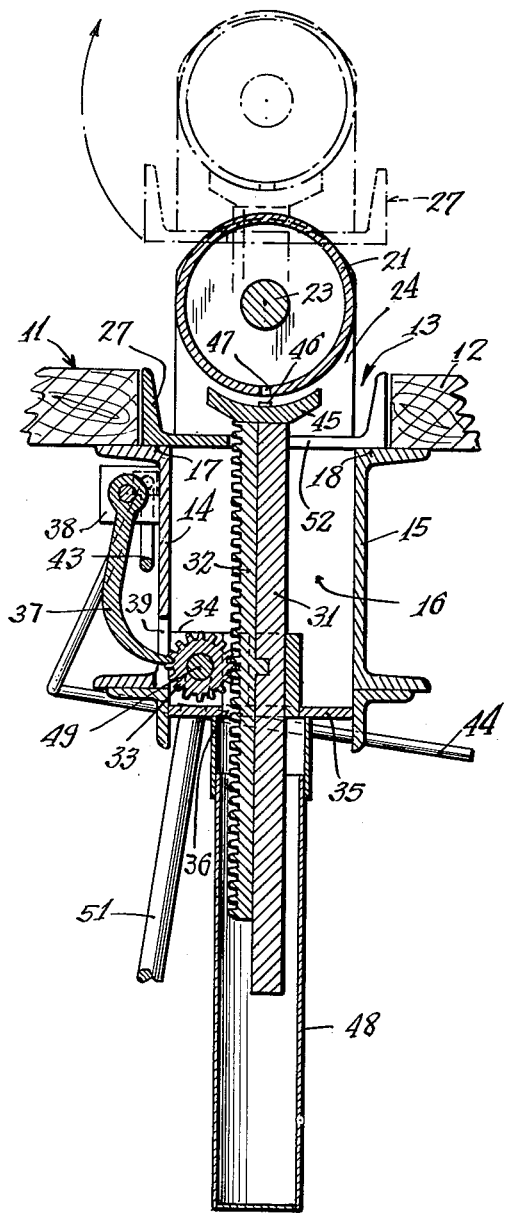
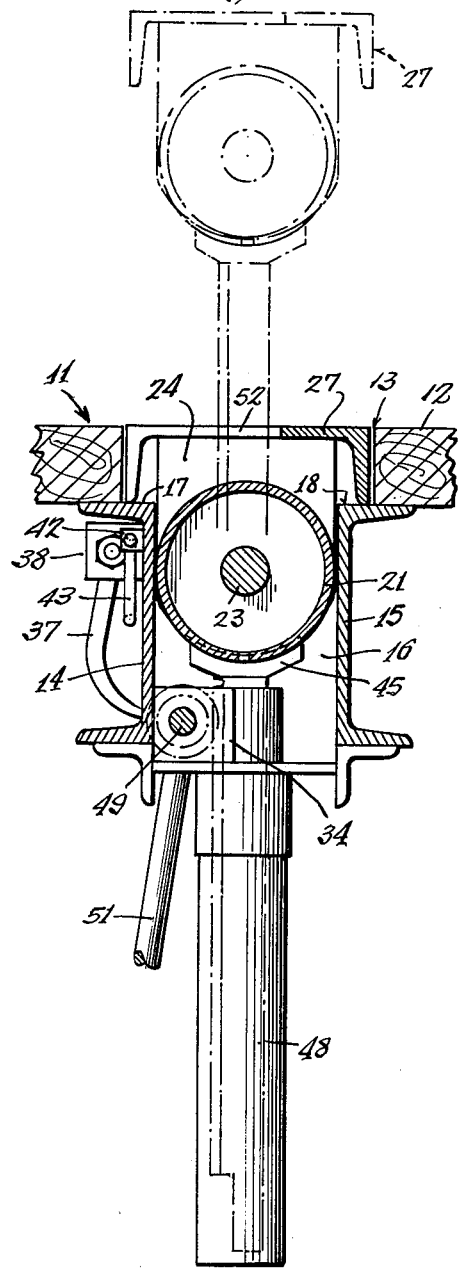
Inventor
Frederick W. Waring
By
Johnson and Kline
Attorneys Patented Dec. 9, 1952

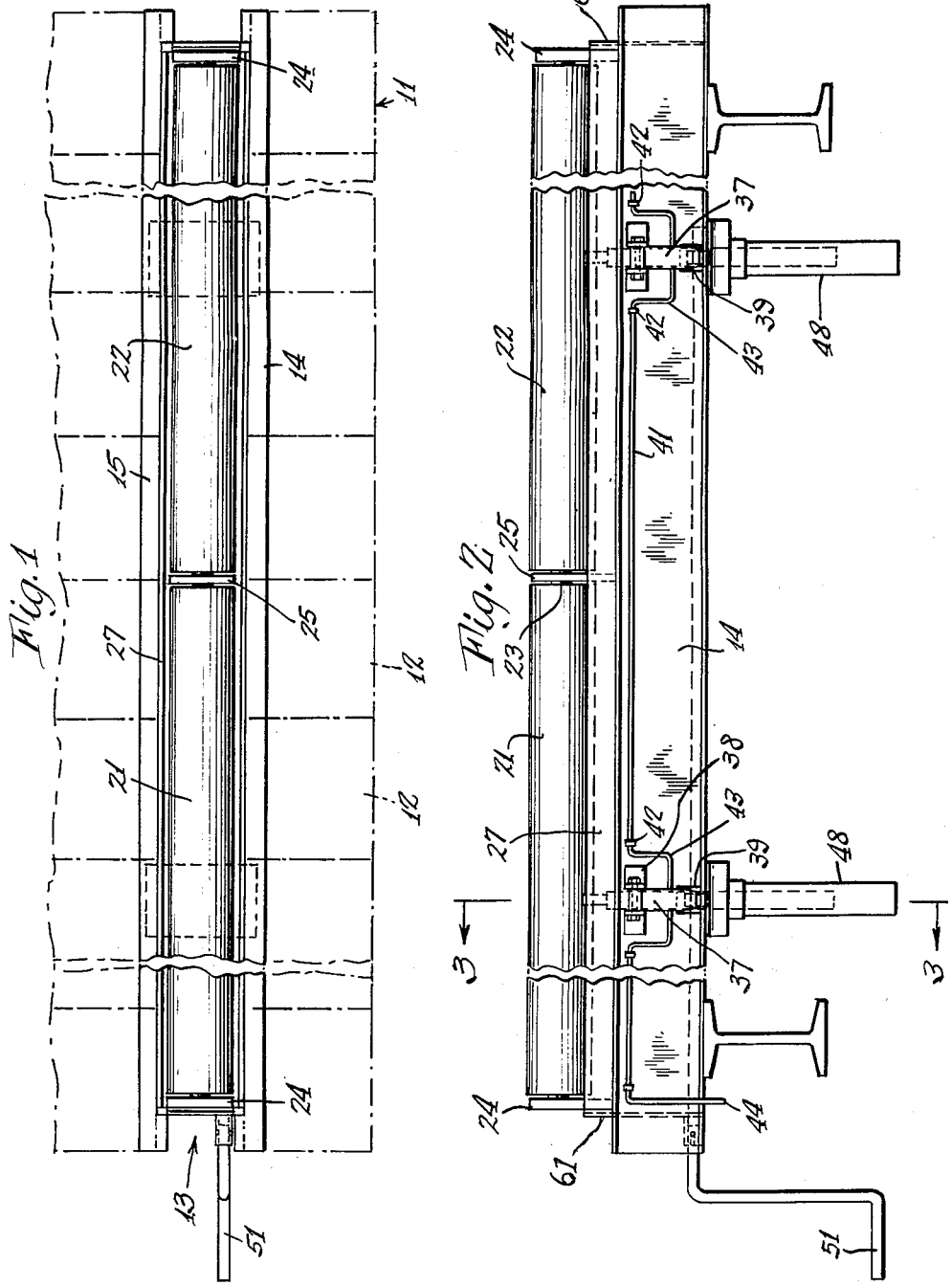

2,620,913

UNITED STATES PATENT OFFICE 2,620,913

ANTIFRICTION LOAD-SUPPORTING DEVICE

Frederick W. Waring, Glenbrook, Conn.

Application August 20, 1949, Serial No. 111,367

12 Claims. (Cl. 193—42)

This invention relates to anti-friction devices for facilitating the movement of material across the surface of a load-carrying platform. Although hereafter described in connection with the floor of a truck body, it will be apparent that many features of the invention are adapted to load-supporting platforms generally.

In handling certain types of material, such for example as lumber, a loading fork is usually employed but anti-friction devices as heretofore constructed have rendered it substantially impossible to use such a fork for loading or unloading a platform provided with such devices. This has been due to the fact that such devices have been formed by rollers, balls, or other rotatable members so positioned as to project above the platform surface to a small extent only, usually just sufficient to enable a load to be easily moved across such surface, but not enough to permit the use of a fork. To project the rollers above the platform sufficiently to permit a fork to be used would interfere with the use of the platform for general purposes.

An object of this invention is to provide an improved anti-friction mechanism for load-supporting platforms constructed and arranged not only to provide an improved anti-friction surface, but also to permit the unhindered use of a loading fork when desired, as well as to provide an unobstructed load-supporting surface when needed for general purposes.

A feature is the provision in a load-supporting platform of anti-friction members having a lifting jack mechanism connected thereto and operable to position the members above the platform a sufficient distance to support a load in such normal operative position, that a lifting fork can be easily inserted between the load and the platform, or to retract the members below the platform level, preferably into recesses formed in the platform, to provide an unobstructed load-supporting floor.

A still further feature is the provision of a device for supporting an anti-friction roller either in retracted position in a roller-receiving platform slot or in normal load-supporting position, which device is arranged to provide a closure for the slot when the roller is retracted therein so as to both provide a continuous, unobstructed platform surface and protect the anti-friction mechanism against damage when not in use.

A further feature is the provision in a structure of this type of a device for holding the anti-friction members against rotation or rocking when desired, thereby to prevent undesirable movement of a load supported thereon.

A still further feature is the provision of an anti-friction device especially constructed and arranged for use on trucks employed in transporting lumber.

These and other objects and features which will be apparent are accomplished by the present invention.

In the accompanying drawings:

Figure 1 is a plan view of an anti-friction device especially adapted for use in connection with the floor of a truck body and constructed in accordance with one embodiment of this invention.

Fig. 2 is an elevation of the device shown in Fig. 1.

Fig. 3 is a sectional view on the line 3—3 of Fig. 2 showing in full lines the anti-friction mechanism in operative load-supporting position.

Fig. 4 is a sectional view showing in full lines the anti-friction mechanism retracted to inoperative position. Both Figs. 3 and 4 show the extended elevated position of the mechanism in broken lines.

Although a single anti-friction device is herein described, it will be understood that any number of such devices can be used in a single installation when desired and when required by the extent of platform surface on which they are employed. The particular embodiment of the invention which is illustrated is shown in connection with the floor 11 of a truck body comprising the usual boards 12 arranged to provide a slot 13 at a predetermined point where installation of the present invention is desired. Spaced floor-supporting beams 14, 15 provide a pocket 16 adapted to receive the anti-friction device when the latter is retracted to provide an unobstructed platform surface. The beams 14, 15 are formed to provide supporting shoulders 17, 18 at the top of the pocket 16 within the slot 13 for a purpose to be hereinafter described.

As illustrated, the anti-friction device is shown as comprising a pair of aligned rollers 21, 22 secured to a shaft 23 supported in roller bearings (not shown) mounted in bearing blocks 24 on opposite ends of the device and a central bearing block 25 between the rollers 21, 22. Any number of aligned rollers can be employed, the number depending on the width of the floor and the number of supporting bearing blocks which are needed for a given installation.

An important advantage of the present invention resides in the fact that the construction permits the use of relatively thin ball bearings to support the roller shaft so that the rollers can be spaced closely together without requiring large gaps between them and without requiring large gaps between the ends of the rollers and the side edges of the truck floor. As a result the rollers cover substantially the entire width of the truck floor and can be used to fully support the lumber or other freight carried thereby.

The bearing blocks 24, 25, are mounted on a supporting channel bar 27 which is of such width as to be easily received in the slot 13 so as to rest upon the supporting shoulders 17, 18 therein as will be more fully described hereafter.

Mechanism is provided for raising and lowering the rollers 21, 22 from retracted, inoperative position in the receiving pocket 16 as shown in full lines in Fig. 4 to the normal load-supporting position shown in full lines in Fig. 3, or to an extended, elevated position shown in broken lines in Figs. 3 and 4. In normal load-supporting position, the supported load is located above the floor 11 sufficiently to permit a loading fork to be inserted between the load and the floor to facilitate loading and unloading operations.

As illustrated, the lifting mechanism includes a separate jack shaft 31 for each roller. The two jack mechanisms are arranged for simultaneous operation. Each has a rack bar 32 secured to one side thereof and meshing with a pinion 33 rotatably supported between the two sides of a U-shaped combination bearing and guide bracket 34 mounted on a supporting plate 35 closing the bottom of the pocket 16. The plate 35 has an opening 36 through which the jack shaft 31 and rack 32 are vertically movable. A simple, effective mechanism is provided for locking the jack shafts at any desired vertical position. This is shown as a separate holding pawl 37 for each jack pivoted between pawl-supporting brackets 38 on the beam 14 and normally extending through an opening 39 in the beam to engage the sprocket 33 and lock it against rotation to hold the jack mechanism and roller in adjusted position. The two pinions are released by swinging the pawls outwardly. As illustrated, a bail 41 is provided for this purpose. The bail extends along the beam 14 and is supported thereon in brackets 42. The bail has arms 43 shaped to engage the pawls 37 when swung outwardly. The bail has an operating extension 44 which can be located in an easily accessible position to provide a bail operating handle.

Mechanism is provided for locking the rollers 21, 22 against rotation to prevent any undesired rocking of the rollers, especially when a load is supported thereon, while permitting the rollers to be freed for rotation when in normal, load-supporting position. As illustrated, a roller-engaging cradle 45 is secured to the upper end of each jack mechanism and a pin 46 is provided on the cradle and positioned to enter a hole 47 in the adjacent surface of the associated roller when the latter engages the cradle 45. The lower end of each jack mechanism is housed in a protecting tube 48 supported on the plate 35. If desired, a supply of lubricant can be maintained in the tubes 48.

Both jack-operating pinions 33 are supported on a pinion shaft 49 extending across the truck body and provided with a crank 51 on one end, whereby the anti-friction rollers can be raised or lowered as desired by manually operating the crank 51.

The invention includes a support for the rollers in normal load-supporting position which not only firmly supports them in such position but which also serves to close the slot 13 to prevent extraneous material from dropping into the elevating mechanism. At the same time the construction is such that when the rollers are retracted into the pockets 16 the support not only closes the slot 13 but also serves to form with the platform members 12 a continuous unobstructed surface. This mechanism comprises the above mentioned channel plate 27 which is rigidly mounted in any suitable manner (not shown) on the bearing blocks 24 and 25. As shown in Fig. 3, when the rollers are in normal load-supporting position in the channel 27 is positioned below the rollers and rests on the supporting shoulders 17, 18 at the top of the pocket 16. The channel has slots 52 for receiving the jack shafts 31 and racks 32 when in this position. When the rollers are retracted into the pockets 16, the channel 27 is swung upwardly to a position above the rollers, as indicated in broken lines in Fig. 4, so that when the rollers are lowered into the pocket 16 the flanges of the channel rest on the supporting shoulders 17, 18 while the web of the channel cooperates with the platform members 12 to form part of an unobstructed load-supporting platform. A guide plate 61 closes each end of the pocket 16 for guiding the raising and lowering movements and preventing endwise displacement of the mechanism under strain.

In operation, when the mechanism is in the normal load-supporting position shown in full lines in Fig. 3 it will be apparent that it provides a rugged, efficient anti-friction device enabling a load supported thereon to be easily moved across the platform surface. The number of such devices which are provided for a given platform will, of course, depend on the size and purposes of the platform. With a truck body, for example, it will be found satisfactory in most cases to provide one device near the rear edge of the tail gate, and a second device about half way up toward the front. In normal load-supporting position, the rollers are supported by the channel 27 on the shoulders 17, 18, while the jack mechanism is lowered as shown in full lines in Fig. 3 to permit free rotation of the rollers. In this position of the anti-friction device, ample space is provided beneath a load on the rollers to permit the employment of a loading fork in handling the load supported thereon. When it is desired to lock the rollers against rotation or rocking, the jack mechanism can be raised by cranking the pinion rod 49 to lift the jack shafts 31. In this operation each cradle 45 engages the surface of the associated roller and the latter is locked against rotation by the pin 46 engaging in the hole 47. Any desired number of openings 47 can be provided around the periphery of the roller for engagement by the pin 46.

When an unobstructed platform is desired, the rollers are first lifted into the extended position to permit the supporting channel 27 being swung upwardly as indicated by the arrow in Fig. 3 and shown in broken lines in Fig. 4. Subsequent lowering of the roller into the pocket 16 moves the channel 27 into the floor slot 13 which is closed thereby and an unobstructed load-supporting platform thus provided. The jack mechanism can be locked in any position by the locking pawls 37 which can be easily released merely by swinging the bails against the pawls to move them outwardly from engagement with the spur gears 33.

The invention can be variously modified and adapted and portions of the improvements can be used without others.

I claim:

1. The combination with a platform of a vertically adjustable load-supporting anti-friction roller mounted for movement into normal load-supporting position to facilitate movement of a load across said platform and support a load above the platform a sufficient distance to permit a loading fork to be operated between the bottom of the load and the platform, and means for moving said roller from said load-supporting position to an inoperative position below the platform level and including roller supporting means adapted to engage said roller, said last-named means also holding said roller against rotation.

2. The combination with a platform of a vertically adjustable load-supporting anti-friction roller mounted for movement into normal load-supporting position to facilitate movement of a load across said platform and support a load above the platform a sufficient distance to permit a loading fork to be operated between the bottom of the load and the platform, and means for moving said roller from said load-supporting position to an inoperative position below the platform level including a roller lifting mechanism engaging the surface of the roller and having means on said mechanism adapted to engage said roller and hold said roller against rotation.

3. The combination with a platform of a vertically adjustable load-supporting anti-friction roller having a pin-receiving means therein mounted for movement into normal load-supporting position to facilitate movement of a load across said platform and support a load above the platform a sufficient distance to permit a loading fork to be operated between the bottom of the load and the platform, and means for moving said roller from said load-supporting position to an inoperative position below the platform level including a roller lifting mechanism engaging the surface of the roller having means including a pin adapted to engage said pin-receiving means in said roller to hold said roller against rotation.

4. The combination with a load-supporting platform of a vertically adjustable load-supporting anti-friction roller mounted for movement into normal load-supporting position to facilitate movement of a load across said platform and support a load above the platform a sufficient distance to permit a loading fork to be operated between the bottom of the load and the platform, means for moving said roller from one position to another including a vertically movable jack shaft, a roller engaging cradle supported on said shaft to engage the surface of the roller, means for raising and lowering said cradle and roller supported thereon including a rack on said jack shaft, a pinion engaging said rack, and means for operating said pinion.

5. The combination with a slotted load-supporting platform of an anti-friction roller adapted to support a load to facilitate movement thereof over said platform, frame members forming a roller-receiving pocket below the slot in said platform and positioned to provide supporting shoulders in said slot, a roller supporting member connected to said roller and movable into position beneath said roller to engage said shoulders and support said roller in normal load-supporting position adjacent said platform above said slot, said supporting member being movable into position above said roller to engage said shoulders and support said roller in retracted position in said pocket, and mechanism for positioning said roller in said normal load-supporting position or for retracting said roller through said slot into said pocket.

6. The combination with a slotted load-supporting platform of an anti-friction roller adapted to support a load to facilitate movement thereof over said platform, frame members forming a roller-receiving pocket below the slot in said platform and positioned to provide supporting shoulders in said slot, a roller supporting member connected to said roller and movable into position beneath said roller to engage said shoulders and support said roller in normal load-supporting position adjacent said platform above said slot, said supporting member being movable into position above said roller to engage said shoulders and support said roller in retracted position in said pocket, and mechanism for positioning said roller in said normal load-supporting position, or for raising said roller above said platform a distance sufficient to permit said supporting member being positioned above said roller whereby said roller can be retracted through said slot into said pocket.

7. The combination with a slotted load-supporting platform of an anti-friction roller adapted to support a load to facilitate movement thereof over said platform, frame members forming a roller-receiving pocket below the slot in said platform and positioned to provide supporting shoulders in said slot, a roller supporting member connected to said roller, lifting means pivotally mounting said roller supporting member for positioning said roller in said normal load-supporting position, or for retracting said roller through said slot into said pocket, said supporting member, upon being lifted, being movable into position beneath said roller to engage said shoulders and support said roller in normal load-supporting position adjacent said platform above said slot or being movable into position above said roller to engage said shoulders and support said roller in retracted position in said pocket, and means on said lifting means for holding said roller against rotation, said means being adapted to free said roller for rotation in normal load-supporting position.

8. The combination in an anti-friction load-supporting mechanism, of a load-supporting anti-friction roller, jack mechanism for raising and lowering said roller to selected position including a vertically movable jack shaft, a roller-engaging cradle on said shaft movable into engagement with the periphery of said roller for supporting said roller on said shaft during raising and lowering movements, means for moving said shaft vertically to adjust the position of said roller, and locking means including a pin on said cradle and a pin-receiving hole in said roller for automatically securing said roller against rotation when said cradle engages the surface thereof.

9. A load-supporting mechanism for a platform comprising in combination a load-supporting roller, a roller supporting member rotatably connected thereto to permit said member being swung into selected horizontal position above or below said roller, spaced frame members between which said roller is vertically movable, spaced supporting shoulders on said frame members whereby when said roller supporting member is positioned above said roller and said roller is positioned between said frame members, said supporting member will engage said shoulders and close the space between said frame members, while when said supporting member is positioned below said roller and said roller is positioned above said frame members said supporting member will engage said shoulders and support said roller in operative load-supporting position.

10. A load-supporting mechanism for a platform comprising in combination a load-supporting roller, a rotatably mounted shaft secured to said roller, a shaft supporting channel rotatably connected thereto to permit said channel being swung into selected horizontal position above or below said roller, spaced frame members between which said roller is vertically movable, spaced supporting shoulders on said frame members whereby when said channel is positioned above said roller and said roller is positioned between said frame members, said channel will engage said shoulders and close the space between said frame members, while when said channel is positioned below said roller and said roller is positioned above said members said channel will engage said shoulders and support said roller in operative load-supporting position, and means for raising and lowering said roller.

11. A load-supporting mechanism for a platform comprising in combination a load-supporting roller, a rotatably mounted shaft secured to said roller, a shaft supporting channel rotatably connected thereto to permit said channel being swung into selected horizontal position above or below said roller, spaced frame members between which said roller is vertically movable, spaced supporting shoulders on said frame members whereby when said channel is positioned above said roller and said roller is positioned between said frame members, said channel will engage said shoulders and close the space between said frame members, while when said channel is positioned below said roller and said roller is positioned above said members said channel will engage said shoulders and support said roller in operative load-supporting position, means for raising and lowering said roller, and means for locking said roller in adjusted vertical position.

12. An anti-friction mechanism for a slotted platform comprising in combination, frame members spaced to provide a receiving pocket below a slot in said platform, shoulders on opposite sides of said pocket adjacent said slot, an anti-friction load-supporting member supported by said shoulders and movable through said slot into and out of said pocket, means housed in said pocket for raising and lowering said member, and means for operating said raising and lowering means from outside of said pocket.

FREDERICK W. WARING.

REFERENCES CITED

The following references are of record in the file of this patent:

UNITED STATES PATENTS

| Number | Name | Date |
| --- | --- | --- |
| 559,552 | Turner | May 5, 1896 |
| 791,218 | Schuyler | May 30, 1905 |
| 1,352,811 | Hunter | Sept. 14, 1920 |
| 1,583,005 | Parker | May 4, 1926 |
| 1,900,149 | Anderson | Mar. 7, 1933 |
| 2,173,298 | Gravenstine | Sept. 19, 1939 |
| 2,360,133 | Houssiere | Oct. 10, 1944 |
| 2,468,925 | De Boer | May 3, 1949 |